United States Patent
McClelland et al.

(10) Patent No.: US 7,142,642 B2
(45) Date of Patent: Nov. 28, 2006

(54) SYSTEMS AND METHODS FOR FACILITATING COMMUNICATIONS INVOLVING HEARING-IMPAIRED PARTIES

(75) Inventors: William A. McClelland, Cedar Rapids, IA (US); Steven C. Johnson, Bethesda, MD (US); Mark R. Logan, Marion, IA (US); Ivaylo I. Ivanov, Cedar Rapids, IA (US); Benjamin W. Dudley, Toddville, IA (US); Kurt P. Haldeman, Hiawatha, IA (US); Chris R. Heidelbauer, Marion, IA (US)

(73) Assignee: MCI, LLC, Basking Ridge, NJ (US)

( * ) Notice: Subject to any disclaimer, the term of this patent is extended or adjusted under 35 U.S.C. 154(b) by 0 days.

(21) Appl. No.: 10/979,811

(22) Filed: Nov. 3, 2004

(65) Prior Publication Data

US 2005/0129185 A1    Jun. 16, 2005

Related U.S. Application Data

(63) Continuation-in-part of application No. 10/798,348, filed on Mar. 12, 2004, which is a continuation-in-part of application No. 10/699,823, filed on Nov. 4, 2003.

(60) Provisional application No. 60/545,954, filed on Feb. 20, 2004, provisional application No. 60/517,899, filed on Nov. 7, 2003.

(51) Int. Cl.
    *H04M 11/00*    (2006.01)
(52) U.S. Cl. ..................... 379/52; 379/93.15
(58) Field of Classification Search ............... 379/52, 379/93.15, 93.35, 93.09, 93.17, 93.21, 93.23, 379/93.24, 93.34, 90.01, 218.02, 207.02, 379/142.01, 142.06; 704/206, 227; 370/352
See application file for complete search history.

(56) References Cited

U.S. PATENT DOCUMENTS

| | | | |
|---|---|---|---|
| 5,680,443 A | 10/1997 | Kasay et al. | |
| 5,745,550 A | 4/1998 | Eisdorfer et al. | |
| 5,787,148 A * | 7/1998 | August | 379/52 |
| 5,809,112 A | 9/1998 | Ryan | |
| 5,959,629 A | 9/1999 | Masui | |
| 5,991,723 A | 11/1999 | Duffin | |
| 6,188,429 B1 | 2/2001 | Martin et al. | |
| 6,389,114 B1 * | 5/2002 | Dowens et al. | 379/52 |
| 6,421,425 B1 | 7/2002 | Bossi et al. | |
| 6,430,602 B1 | 8/2002 | Kay et al. | |
| 6,480,484 B1 | 11/2002 | Morton | |
| 6,603,835 B1 | 8/2003 | Engelke et al. | |
| 6,611,804 B1 | 8/2003 | Dorbecker et al. | |
| 6,628,967 B1 | 9/2003 | Yue | |
| 6,714,793 B1 | 3/2004 | Carey et al. | |
| 6,757,732 B1 | 6/2004 | Sollee et al. | |
| 6,801,613 B1 | 10/2004 | Hamilton | |
| 6,914,964 B1 | 7/2005 | Levine | |
| 6,950,500 B1 | 9/2005 | Chaturvedi et al. | |
| 6,950,501 B1 | 9/2005 | Chaturvedi et al. | |
| 2002/0037074 A1 | 3/2002 | Dowens et al. | |

(Continued)

FOREIGN PATENT DOCUMENTS

WO    03/021796    3/2003

*Primary Examiner*—Stella Woo

(57) ABSTRACT

A method for providing communication services for the hearing-impaired may include receiving a telephone call having a terminating number associated with a hearing-impaired party. The method may also include forwarding the telephone call to a communication assistant and establishing a communication link from the communication assistant to the hearing-impaired party based on the terminating number.

43 Claims, 5 Drawing Sheets

U.S. PATENT DOCUMENTS

2002/0057765 A1 5/2002 Hyziak et al.
2002/0065820 A1 5/2002 Enns
2002/0199019 A1 12/2002 Battin et al.
2003/0072420 A1 4/2003 Feigenbaum
2004/0024822 A1 2/2004 Werndorfer et al.

* cited by examiner

FIG. 4

| TELEPHONE NO. 410 | PREFERENCES/ORDER 420 | | | | | OTHER 430 |
| --- | --- | --- | --- | --- | --- | --- |
| | 420-1 VRS | 420-2 IP/AIM | 420-3 TTY | 420-4 SMS | 420-5 PAGER | |
| 571-123-4567 | | | | | | BSMITH@AOL.COM<br>BSMITH1<br>BILL SMITH |
| | | | | | | |
| | | | | | | |

400

SYSTEMS AND METHODS FOR FACILITATING COMMUNICATIONS INVOLVING HEARING-IMPAIRED PARTIES

RELATED APPLICATIONS

This application is a continuation-in-part of U.S. patent application Ser. No. 10/798,348 filed Mar. 12, 2004, which is a continuation-in-part of U.S. patent application Ser. No. 10/699,823 filed Nov. 4, 2003, the disclosures of which are both hereby incorporated by reference herein. This application also claims priority under 35 U.S.C. § 119 based on U.S. Provisional Application Ser. No. 60/545,954 filed Feb. 20, 2004 and U.S. Provisional Application Ser. No. 60/517,899 filed Nov. 7, 2003, the disclosures of which are both hereby incorporated by reference herein.

FIELD OF THE INVENTION

The present invention relates to providing communication services and, more particularly, to providing communication services for hearing-impaired parties.

BACKGROUND OF THE INVENTION

A conventional telecommunication device for the deaf/teletype (TDD/TTY) enables people who are hearing-impaired or deaf to communicate with other parties via standard telephone lines. For example, one way in which a deaf party may communicate with another party is if both parties use a TDD/TTY. In this case, a calling party may type using a standard keyboard included with the TDD/TTY and the called party reads the message on a display associated with his/her TDD/TTY. The called party may similarly type a message using his/her TDD/TTY and the calling party may read the message using his/her display.

A second way in which a hearing-impaired/deaf person may communicate via standard telephone lines is referred to as relay. In this case, a hearing party wishing to communicate with a hearing-impaired party calls a designated telephone number associated with a relay service provider, typically an 800 number or a 711 number. The hearing party may then be connected to a communication assistant (CA) (also referred to as a relay operator). The CA may then ask the hearing party for the telephone number of the hearing-impaired party with whom he/she would like to communicate. The CA may then dial the telephone number of the hearing-impaired party, who may be using a TDD/TTY, and establish a connection with the hearing-impaired party. The CA may then type messages corresponding to messages voiced by the hearing party for display on the hearing-impaired party's TDD/TTY. The CA also sends voice messages corresponding to text typed by the hearing-impaired party.

One problem with the relay method described above is that the hearing party must first dial a designated phone number associated with a relay service provider, such as an 800 number or 711 number, prior to establishing a connection to the hearing-impaired party. In many cases, the hearing party will not know the telephone number associated with the relay service provider. Alternatively, the hearing party may not bother to make the call to the hearing-impaired party due to its somewhat cumbersome approach in actually establishing a connection with the desired party. The end result is that telerelay services (TRS) are often not utilized or are under utilized by hearing parties to initiate communications to hearing-impaired parties.

SUMMARY OF THE INVENTION

According to one aspect of the invention, a method for providing communication services is provided. The method includes receiving a telephone call from a hearing party, where the telephone call has a terminating number corresponding to a telephone number associated with the hearing-impaired party. The method also includes forwarding the telephone call to a communication assistant and establishing a communication link from the communication assistant to the hearing-impaired party based on the terminating number.

According to a further aspect of the invention, a system including a server and a first device associated with a communication assistant is provided. The server is configured to receive a telephone call from a hearing party, where the telephone call has a terminating number. The server is also configured to identify a communication assistant and forward the telephone call. The first device is configured to receive the forwarded telephone call and establish a communication link with the hearing-impaired party based on the terminating number.

Another aspect of the present invention provides a method that includes receiving a telephone call from a first party, where the telephone call has a terminating number corresponding to a telephone number associated with a hearing-impaired party. The method also includes identifying a first communication method associated with the hearing-impaired party and establishing a communication link to the hearing-impaired party using the first communication method.

In still another aspect of the invention, a method is provided that includes receiving first information identifying at least one method by which a hearing-impaired party wishes to communicate. The method also includes receiving second information identifying an order with respect to attempting to establish communications with the hearing-impaired party via the at least one method. The method further includes storing the first and second information.

Other features and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

FIG. 4 illustrates an exemplary database stored on the server of FIG. 2 in an implementation consistent with the invention.

DETAILED DESCRIPTION

Figure 1:
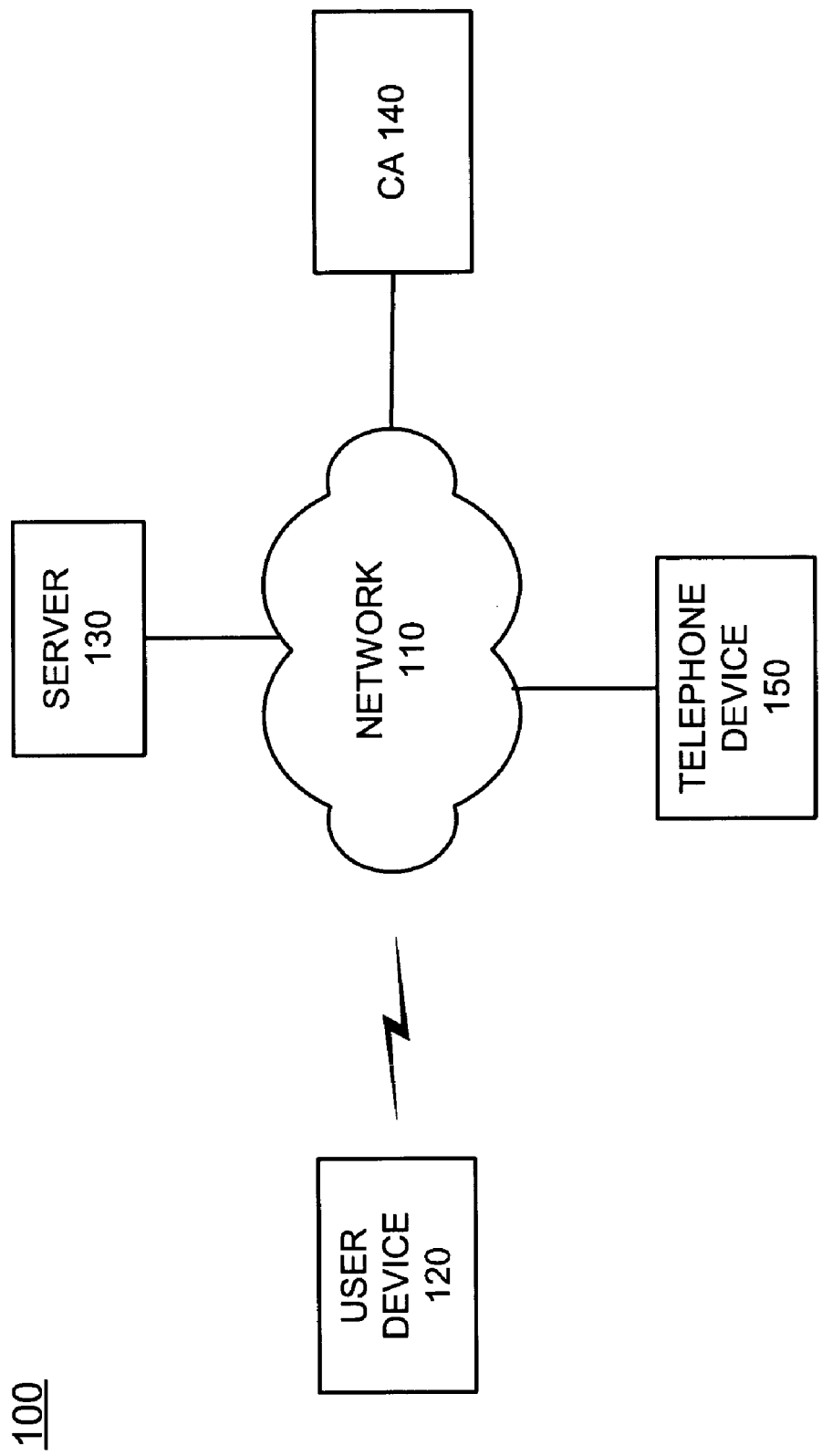
FIG. 1 is a diagram of an exemplary system in which methods and systems consistent with the present invention may be implemented.

FIG. 1 is a block diagram of an exemplary system 100 in which methods and systems consistent with the present invention may be implemented. System 100 includes network 110, user device 120, server 130, CA 140, and telephone device 150. The exemplary configuration illustrated in FIG. 1 is provided for simplicity. It should be understood that a typical system may include more or fewer devices than illustrated in FIG. 1. For example, a conference bridge device/platform that links multiple parties in a conference call and the associated telephone circuits, switching devices, software or hardware controlled devices, etc., involved in completing the conference call may be included in system 100. These devices may be used to facilitate communications involving a hearing-impaired party, a CA and a hearing party.

Network 110 may include one or more wired and/or wireless networks that are capable of receiving and transmitting data and voice signals. For example, network 110 may include one or more public switched telephone networks (PSTNs) or other type of switched network. Network 110 may also include packet switched networks, such as the Internet, an intranet, a local area network (LAN), a wide area network (WAN), or another type of network that is capable of transmitting data from a source device to a destination device. Network 110 may also include one or more wireless networks and may include a number of transmission towers for receiving wireless signals and forwarding the wireless signals toward the intended destination.

Network 110 may further include one or more devices, such as a network gateway, that allow divergent transport networks to communicate and cooperatively carry traffic. A network gateway may provide for interoperation at two levels, e.g., between different signaling schemes and between different media forms. For example, the network gateway may adapt between SS7 signaling used in a portion of network 110 and session initiation protocol (SIP) or H.323 protocols used by another portion of network 110. The network gateway may also adapt analog or pulse code modulation (PCM) encoded voice signals to a packetized data stream suitable for transport over network 110.

User device 120, consistent with the present invention, may include any device that is able to execute some form of text messaging. For example, user device 120 may include a conventional TDD/TTY. User device 120 may also include a conventional plain old telephone system (POTS) phone with a text screen to display text messages or an Internet protocol (IP) telephone with a text screen that is configured to transmit and receive voice messages using, for example, voice over Internet protocol (VoIP). User device 120 may also include a computing device, such as a personal computer (PC), laptop computer, personal digital assistant (PDA) or a web-based appliance that is able to execute a text messaging program, such as an instant messaging program, and transmit and receive data via network 110. User device 120 may further include any wireless device, such as a cellular telephone, a PDA or a pager, that executes a wireless application protocol (WAP), or another protocol, that enables user device 120 to transmit and receive data via a network, such as network 110.

Server 130 may include any server/computing device that is able to connect to *network 110 and transmit and receive data via network 110. Server 130 may include a firewall (not shown) that provides security-related services for server 130.

Server 130 may also include a gateway (not shown) that supports persistent, full duplex transmission control protocol (TCP)/Internet Protocol (IP) connections between server 130 and user device 120 and other devices/parties, such as CA 140. For example, the gateway may include one or more call processors that enable a client application programming interface (API) to maintain a persistent socket connection between a client application executed by user device 120 and server 130 and/or CA 140. Server 130 enables a hearing party to establish communications with a hearing-impaired party by simply placing a call to a telephone number associated with the hearing-impaired party, as described in more detail below.

CA 140 may represent any conventional CA workstation/computer and operator used to facilitate communications between a hearing-impaired party and a hearing party. CA 140 may include a workstation or computer, such as a personal computer or laptop. CA 140 may be used in any TRS environment, such as a voice carry over (VCO) environment, a hearing carry over (HCO) environment, a speech-to-speech (STS) environment, etc.

In an exemplary implementation consistent with the invention, CA 140 may include a voice recognizer that performs voice or speech recognition. The voice recognizer may include software and/or hardware that is able to convert received voice messages into text messages.

CA 140 may also include a high speed text input device, such as a stenographic device, a communication access real-time translation (CART) device, etc. These high speed text input devices may enable an operator at CA 140 to keep up with a conversation between a hearing party and a hearing-impaired party.

CA 140 may also include any conventional telephone (not shown), such as one used by a hearing party, that interfaces with the PSTN to place and receive telephone calls. For example, the telephone device may be a standard telephone, a cordless telephone, a cellular telephone or any other type of conventional telephone. The telephone device may also include any type of device that is capable of transmitting and receiving voice signals to/from a data network. For example, the telephone device may include any client, such as a computer device, a web-based appliance, etc., that is configured to provide telephone functions. The telephone device may, for example, be a session initiation protocol (SIP)-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional PC, laptop computer or other computing device.

Telephone device 150 may include any type of device that is capable of transmitting and receiving voice signals to/from a data network, such as network 110. For example, telephone device 150 may include any conventional telephone, such as those used by a hearing party, that interfaces with the PSTN to place and receive telephone calls. Telephone device 150 may be a standard telephone, a cordless telephone, a cellular telephone or any other type of conventional telephone.

Telephone device 150 may also include any client, such as a computer device, a web-based appliance, etc., that is configured to provide telephone functions. Telephone device 150 may, for example, be a SIP-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional PC, laptop computer or other computing device.

In an exemplary implementation consistent with the invention, server 130 and CA 140 enable a hearing party to establish communications with a hearing-impaired party by simply placing a call to a telephone number associated with the hearing-impaired party. Server 130 and CA 140 are illustrated in FIG. 1 as being connected via network 110. In alternative implementations, server 130 and CA 140 may be connected directly to each other, connected via a LAN, connected via a private network, etc. In still other alternative implementations, the functions performed by server 130 and CA 140, described in more detail below, may be performed by a single device/platform.

Figure 2:
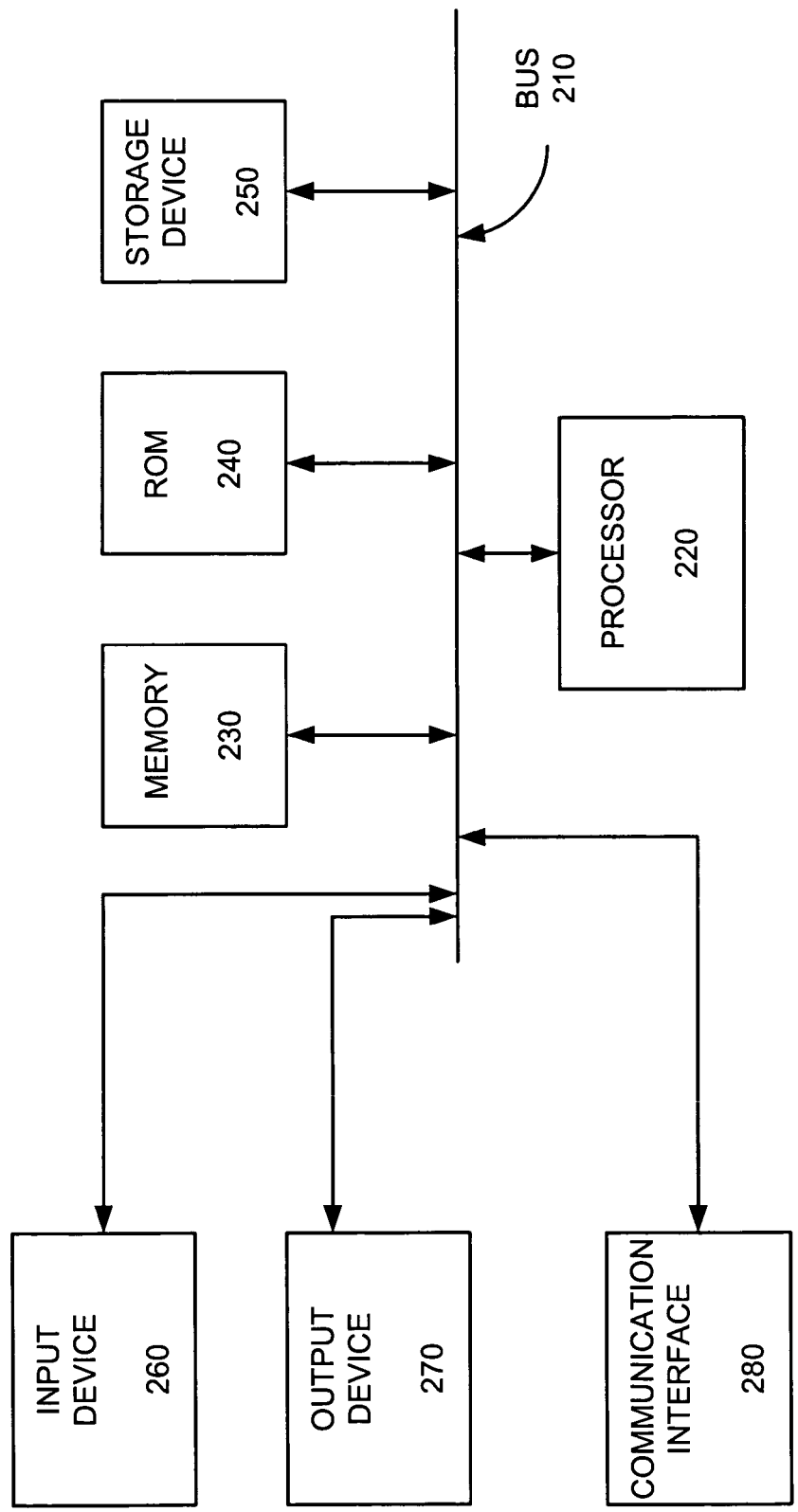
FIG. 2 is an exemplary block diagram of the server and CA workstation of FIG. 1 in an implementation consistent with the invention.

FIG. 2 illustrates an exemplary configuration of each of server 130 and CA 140 in an implementation consistent with the invention. Other configurations may alternatively be used. Server 130/CA 140 may include a bus 210, a processor 220, a memory 230, a read only memory (ROM) 240, a storage device 250, an input device 260, an output device 270, and a communication interface 280. Bus 210 permits communication among the components of server 130/CA 140.

Processor 220 may include any type of conventional processor or microprocessor that interprets and executes instructions. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a conventional ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions.

Input device 260 may include one or more conventional mechanisms that permit an operator to input information to server 130, such as a keyboard, a mouse, a pen, voice recognition and/or biometric mechanisms, etc. Output device 270 may include one or more conventional mechanisms that output information to the operator, including a display, a printer, one or more speakers, etc. Communication interface 280 may include any transceiver-like mechanism that enables server 130 to communicate with other devices and/or systems. For example, communication interface 280 may include a modem or an Ethernet interface to a LAN. Alternatively, communication interface 280 may include other mechanisms for communicating via a network.

Server 130, consistent with the present invention, provides a platform through which a hearing-impaired party may be assigned a telephone number and register preferences with respect to receiving communications from hearing parties. CA 140, consistent with the present invention, provides a platform through which a hearing party at telephone device 150 and a hearing-impaired party at user device 120 communicate. According to an exemplary implementation, server 130/CA 140 may perform various processes in response to processor 220 executing sequences of instructions contained in memory 230. Such instructions may be read into memory 230 from another computer-readable medium, such as storage device 250, or from a separate device via communication interface 280. It should be understood that a computer-readable medium may include one or more memory devices or carrier waves. Execution of the sequences of instructions contained in memory 230 causes processor 220 to perform the acts that will be described hereafter. In alternative embodiments, hard-wired circuitry may be used in place of or in combination with software instructions to implement the present invention. Thus, the present invention is not limited to any specific combination of hardware circuitry and software.

Figure 3:
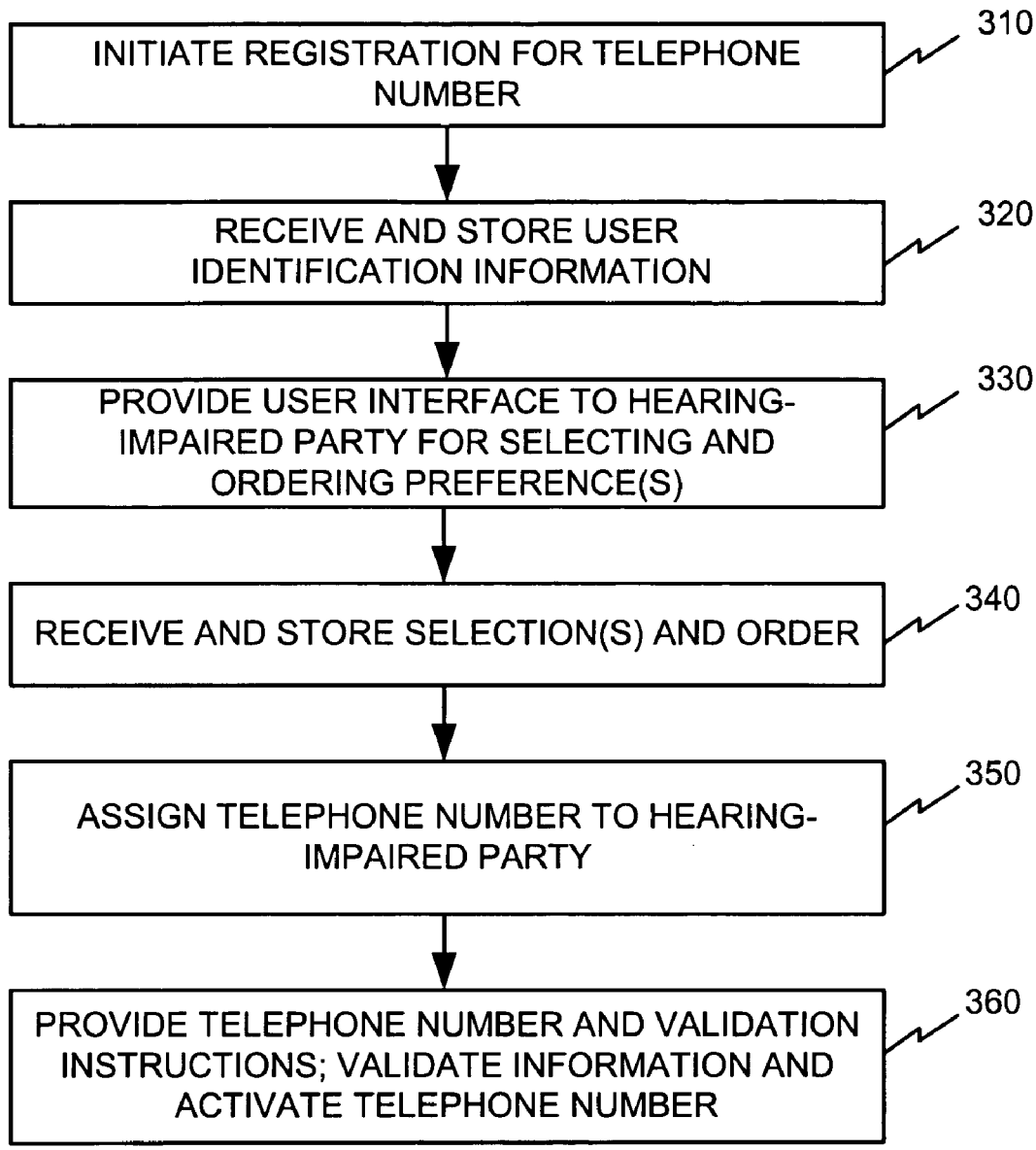
FIG. 3 is an exemplary flow diagram, consistent with the present invention, illustrating processing associated with registering calling preferences, assigning a telephone number and validating the telephone number.

FIG. 3 is an exemplary flow diagram, consistent with the present invention, illustrating processing associated with registering calling preferences, assigning a telephone number and validating the telephone number. Processing may begin with a hearing-impaired party initiating the process of registering or signing up for a telephone number at which he/she can be reached without requiring the calling party to dial a number associated with a relay service or similar service (act 310).

For example, a hearing-impaired party at user device 120 may connect to server 130 via network 110 by entering an Internet address (e.g., a website address or a uniform resource locator (URL)) in a browser being executed by user device 120. Alternatively, user device 120 may execute a WAP that enables a party associated with user device 120 to enter an Internet address associated with server 130. In still other alternatives, the hearing-impaired party (or someone acting on behalf of the hearing-impaired party) may dial a telephone number associated with server 130 to register over the telephone or a sales person associated with server 130 may contact the hearing-impaired party and register the hearing-impaired party. Server 130, consistent with the invention, may be affiliated with a service provider that has reserved 10 digit telephone numbers (i.e., area code plus seven digit phone number) in a number of area codes for hearing-impaired parties.

Assume that the hearing-impaired party has contacted server 130 via network 110. In this case, server 130 may provide a user interface (UI) to the hearing-impaired party that requests that the hearing-impaired party enter various identifying information. For example, the UI may request the name, email address and state and city of residence of the hearing-impaired party. The UI may also request that the hearing-impaired party provide an instant messaging screen name used by the hearing-impaired party when communicating via instant messages (IMs).

The UI, consistent with the invention, may include one or more drop down boxes that facilitate entry of the above information. The hearing-impaired party enters the information and transmits the information to server 130. Server 130 receives and stores the user identification information (act 320).

In an exemplary implementation, once server 130 has received the identification information, server 130 may transmit a second UI to the hearing-impaired party. This second UI allows the hearing-impaired party to select one or more preferences regarding methods of communicating and to assign an order for the selected methods (act 330). The order may represent the most preferred communication method to the least preferred communication method of the hearing-impaired party. For each selection, user device 120 of the hearing-impaired party may include the particular software and/or hardware that enables user device 120 to communicate via the selected method.

For example, a number of different methods or services associated with communications involving hearing-impaired parties may be available. These services may include, for example, a number of methods of communicating via the Internet, referred to as Internet protocol (IP)-relay. IP-relay may allow a hearing-impaired party to receive text messages via any computer device, PDA, wireless device, etc. IP-relay may include a number of individual types of communications, such as video relay service (VRS), short message service (SMS), instant messaging, etc. Other types of services that may be available include paging, TDD/TTY, telephone with text display, etc. These services will be described briefly below. It should be understood that additional methods/services may also be used to facilitate communications involving hearing-impaired parties, such as other Internet related communication methods, and these other methods/services may also be available for selection via the UI.

IP-relay as discussed above may include a VRS service. VRS is a service that allows a hearing impaired party to communicate with other parties using sign language. For example, a hearing-impaired party and a CA may be coupled via a high speed Internet link that allows each party having a camera to transmit video images over the high speed link. The hearing-impaired party may then send sign language images to a video interpreter (i.e., the operator) at CA 140. The operator at CA 140 may receive the video images and voice a message to the hearing party corresponding to the received sign language images. The operator at CA 140 may also translate the hearing party's voice messages to sign language and transmit the sign language images to the hearing-impaired party via the video link.

SMS is a service that allows a hearing-impaired party to receive and send short text messages via a wireless device, such as a cellular telephone or PDA. Using SMS, the operator at CA 140 may transmit SMS messages that correspond to voice messages from a hearing party for display on the hearing-impaired party's wireless device. The hearing-impaired party may also transmit SMS messages to the operator at CA 140, who relays voice messages corresponding to the SMS messages.

Instant messaging is a service that utilizes conventional instant messaging software, such as AOL Instant Messenger (AIM), Microsoft Messenger, etc., to transmit the text messages. For example, the operator at CA 140 may receive voice messages from a hearing party and type corresponding IMs for transmission to the hearing-impaired party. The operator at CA 140 may also receive IMs from the hearing-impaired party and voice the corresponding message to the hearing party.

Paging is a service that allows a hearing-impaired party to receive and send text messages via a pager device. Using paging, the operator at CA 140 may transmit messages that correspond to voice messages from a hearing party for display on the hearing-impaired party's pager. The hearing-impaired party may also transmit messages via the pager to the operator at CA 140, who relays voice messages corresponding to the pager messages.

TTY/TDD is a service that allows a hearing-impaired party to receive and send text messages via a conventional TTY/TDD.

Telephone with text display is a service that allows the hearing impaired party to receive phone calls via a conventional telephone with a text display. The telephone may be used for situations, such as voice carry over (VCO), where the hearing-impaired party can speak, but is unable to hear. In this case, the operator at CA 140 may type text messages corresponding to received voice messages for display on the text display associated with the hearing-impaired party's telephone. The hearing-impaired party may read the text message and voice a reply for transmission to the hearing party (without retranslation by the operator at CA 140). In this service, the telephone used by the hearing-impaired party may be a POTS telephone device, an IP-based telephone that utilizes voice over IP (VoIP) or another type of conventional telephone.

The UI downloaded to user device 120 may include boxes for selecting each of the above described services and may also include variations or sub-selections for each of the above services, as described in more detail below. The UI may instruct the hearing-impaired user to select one or more services he/she wishes to use when communicating with others, such as hearing parties, and an order associated with the selected service(s).

The hearing-impaired party may then make his/her selection(s), provide the order of preference with respect to the selection(s) and transmit the information to server 130. Server 130 receives the selection(s) and order information and stores this information (act 340). As discussed above, some of the selections may require that the hearing-impaired party provide a further selection regarding the selection.

For example, if the hearing-impaired party selects instant messaging, the UI (or a subsequent UI) may request a further selection regarding a particular type of instant messaging software he/she uses (AOL IM (AIM), Microsoft Messenger, Yahoo IM, etc).

After receiving the selection/order information, server 130 may assign a telephone number to the hearing-impaired party (act 350). Server 130, consistent with the invention, may store the telephone number and other information in a database for use when a call to the hearing-impaired party is received, as described in more detail below.

FIG. 4 illustrates an exemplary database 400 stored in server 130, such as in storage device 250 (FIG. 2), in an implementation consistent with the invention. Alternatively, database 400 may be located externally from server 130. Referring to FIG. 4, database 400 includes a telephone number field 410, preferences/order field 420 and other field 430. Telephone number field 410 may store the telephone numbers assigned by a service provider to hearing-impaired parties. Preferences/order field 420 may store the preferences/orders provided by the hearing-impaired party regarding the preferred service(s) selected by each respective hearing-impaired party. Other field 430 may store, for example, the email address, the IM screen name used by the hearing-impaired party, the name of the hearing-impaired party, etc.

As an example, the first entry in database 400 stores the telephone number 571-123-4567 in field 410, the email address bsmith@aol.com, screen name bsmith1 and the name Bill Smith in other field 430. This information indicates that Bill Smith, who has an email address of bsmith@aol.com and a IM screen name of bsmith1, has been assigned the telephone number 571-123-4567. The information stored in field 420 represents Bill's selected preferences with respect to communicating with others. In this example, Bill's preferred communication method/service is VRS, followed by IP-AIM, TTY, SMS and pager (in that order), as indicated by the information stored in fields 420-1 through 420-5. Server 130 and/or CA 140 uses the information in database 400 when attempting to establish communications with Bill, as described in more detail below.

In an exemplary implementation consistent with the invention, after a hearing-impaired party has been assigned a telephone number, server 130 may perform a validation process before the telephone number may be used. For example, once the identification and preference/order information has been received, server 130 may provide the hearing-impaired party with his/her assigned telephone number along with instructions for validating/activating the telephone number (act 360).

The telephone number and instructions may be forwarded to the hearing-impaired party via network 110 as part of the registration process. Server 130 may also send a confirmation number and/or tracking number that allows the hearing-impaired party to check on the status of the telephone number at a later time (e.g., determine whether the telephone number has been activated, deactivated, etc).

The validation instructions provided to the hearing-impaired party may request that the hearing-impaired party log into his/her instant messaging client using the same instant messaging screen name previously provided to server 130 (e.g., at act 320). The instructions may further request that the hearing-impaired party send an IM to server 130, (identified, for example, by the screen name MYIPRELAY) with the key word "validate" and the telephone number provided by server 130.

Server 130 receives the IM and determines whether the screen name via which the IM was received matches the IM screen name previously provided by the hearing-impaired party. If the screen names match, server 130 validates the information and activates the telephone number (act 360). If the screen names do not match, server 130 may deny validation of the telephone number. This validation process ensures that screen name provided by the hearing-impaired party (at act 320) is valid and also prevents an individual from signing up for hearing-impaired services using other party's screen names.

Other methods of validating the information provided by the hearing-impaired party may also be used in alternative implementations. For example, server 130 may verify the hearing-impaired party's email address is the same as that provided. Server 130 may also verify that other information provided by the party signing up for the service is accurate and could only be provided by that party. In one implementation, server 130 may access external databases, such as a local or long distance telephone company's databases to ensure that the information provided matches information in the external database. Server 130 may also email a personal identification number (PIN) to the hearing-impaired at an address known to be associated with the hearing-impaired party. The hearing-impaired party may be instructed to then send an email to server 130 with this PIN.

Once the telephone number has been provided and validated, any party may use the assigned telephone number to establish communications with the hearing-impaired party, as described in more detail below. In each case, the calling party may simply place the call to the hearing-impaired party's telephone number and server 130 automatically routes the call.

Figure 5:
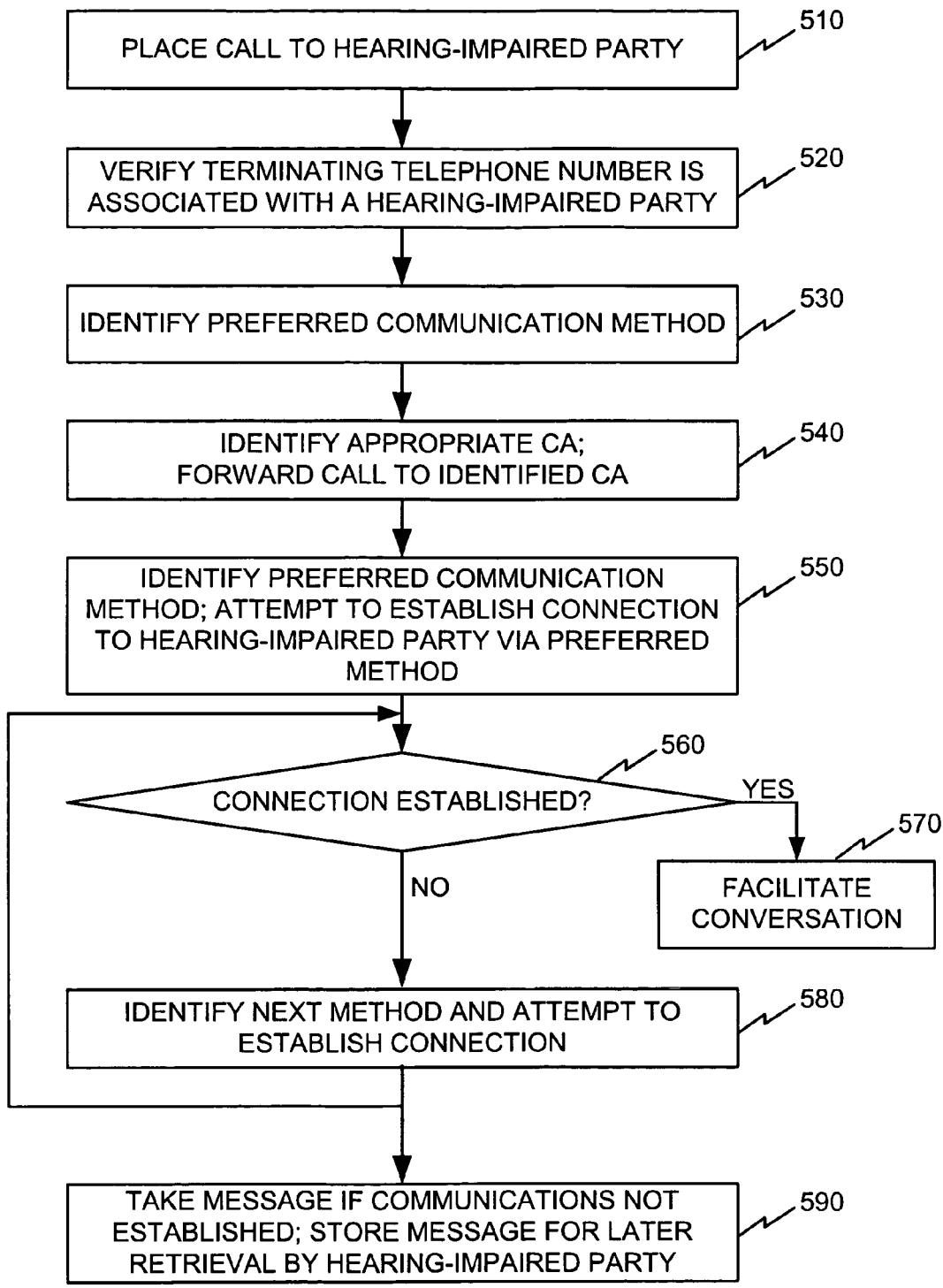
FIG. 5 illustrates exemplary processing associated with establishing communications with a hearing-impaired party.

FIG. 5 illustrates exemplary processing associated with establishing communications with a hearing-impaired party. Processing may begin with a hearing party, such as a hearing party at telephone device 150 placing a telephone call to the hearing-impaired party (act 510). The call may be placed to the telephone number assigned to the hearing-impaired party by server 130 (FIG. 3, at act 350). The hearing-impaired party may have informed his/her friends and family of the assigned telephone number and this telephone number may also be listed in various directories (e.g., the white pages).

After placing the telephone call, one or more devices/platforms in system 100 (not shown in FIG. 1) may forward the call to server 130. That is, one or more devices/platforms associated with routing the call may store a list of telephone numbers that represent telephone numbers associated with hearing-impaired parties. If the terminating telephone number matches one of these numbers associated with a hearing-impaired party, these devices/platforms may forward the call to server 130.

Server 130 receives the call and verifies that the terminating telephone number is associated with a hearing-impaired party (act 520). That is, server 130 searches database 400 to determine whether the terminating telephone number is stored in one of the entries in field 410. If the terminating telephone number is not stored in database 400, server 130 may simply forward the call back to a device/platform that forwarded the call to server 130 and instruct that device/platform to forward the call on to its destination.

Assume that the terminating telephone number is stored in database 400. In this case, server 130 identifies the preferred communication method/service via which the hearing-impaired party wishes to communicate (act 530). That is, server 130 reads the identifier in field 420-1 of the entry in database 400 corresponding to the terminating telephone number to determine the preferred communication method/service.

For example, assume that the terminating telephone number is 571-123-4567 (i.e., entry 1 in database 400 of FIG. 4). In this case, server 130 reads field 420-1 and determines that VRS is the preferred service by which Bill Smith wishes to communicate.

Server 130 may then identify a CA capable of handling the call (act 540). For example, server 130 may search a table containing a list of CAs and their respective. statuses. The status of each CA may indicate whether that particular CA is currently handling a call (e.g., involved in a conversation between a hearing-impaired party and a hearing party), is off-line/not available or is available to help a caller. The table may be stored, for example, in storage device 250 (FIG. 2).

The table may also include information indicating the particular types of calls that the CA can handle (e.g., VRS calls, IM calls, TDD/TTY calls, etc.). The table may further include information regarding particular skills of the respective operators at each CA workstation, such as whether the operator speaks a foreign language (e.g., Spanish, French, etc.).

Assume that server 130 determines that CA 140 is equipped to handle VRS calls and that CA 140 is available to help a caller. Further assume that server 130 identifies CA 140 as the appropriate CA to assist in the current call. Server 130 may then forward the telephone call to CA 140 (act 540).

CA 140 receives the call and the terminating telephone number associated with the hearing-impaired party. The operator at CA 140 may then attempt to establish a connection to the hearing-impaired party via the preferred method previously selected by the hearing-impaired party (VRS in this example) (act 550).

For example, in one implementation, the hearing-impaired party at user device 120 may have loaded VRS software on user device 120 that allows user device 120 to communicate via VRS using a high speed Internet connection. In this implementation, the operator at CA 140 may attempt to connect to the hearing-impaired party at user device 120 via VRS software loaded on CA 140 that is similar to the VRS software on the user side. The VRS software loaded on CA 140 may, however, be "server side" software of a client/server VRS software program. The server side software on CA 140 may access information stored in database 400, such as the user name, email address and other information for attempting to connect to user device 120 via the VRS program. In an exemplary implementation, CA 140 may automatically attempt to connect to the hearing-impaired party at user device 120 via the VRS software based on information stored in database 400 without input from the operator at CA 140.

CA 140, consistent with the invention, maintains the telephone connection with the calling party (i.e., the hearing party at telephone device 150) while attempting to establish a connection with the hearing-impaired party at user device 120. In this example, assume that user device 120 is powered up and online at the time that CA 140 attempts to establish a connection with the hearing-impaired party. CA 140 then "rings" the hearing-impaired party at user device 120. Upon receiving the call, the VRS software executed at user device 120 may signal the hearing-impaired party that an incoming call has been received. The signal may include, for example, displaying a flashing telephone icon to indicate that an incoming call has been received.

If a connection is established (act 560), CA 140 may facilitate a conversation between the hearing party at telephone device 150 and the hearing-impaired party at user device 120 (act 570). For example, assume that the hearing-impaired answers the call by, for example, clicking on the ringing telephone icon. CA 140 may receive an indication that the call has been answered. The hearing-impaired party at user device 120 may then answer the call by signing "Hello, this is Bill". CA 140 may receive the signed message via the high speed Internet link and may voice the corresponding voice message to the hearing-impaired party at telephone device 150. As discussed previously, the VRS system requires that each party (CA and hearing-impaired party) has a camera that permits transmission of video images to the other party.

The hearing party at telephone device 150 may receive the voice message from CA 140 and may voice a message, such as, "Hi Bill, this is Jim, how are you doing?" The operator at CA 140 may then translate this voice message into sign language, sign the message and transmit the video images to the hearing-impaired party at user device 120. The conversation between the hearing party at telephone device 150 and the hearing-impaired party at user device 120 may then proceed in this manner, with the CA 140 acting as an interpreter between the hearing and hearing-impaired parties. That is, the operator at CA 140 receives voice messages from the hearing party at telephone device 150 and signs the message using, for example, American Sign Language, for transmission to the hearing-impaired party at user device 120. The hearing-impaired party at user device 120 may then sign his/her responses and the operator at CA 140 voices the corresponding message the hearing party at telephone device 150.

In the event that the called party is not available via the VRS system (act 560) (e.g., the called party's user device 120 was not able to receive the VRS call or the VRS software at user device 120 was not activated), CA 140 (or server 130) may attempt to establish a link via the next preferred method of communicating (act 580). That is, CA 140 may read the information in field 420-2 to identify the next preferred method of communicating (IP-AIM in the example in FIG. 4).

In this case, CA 140 may access the hearing-impaired party's screen name stored in other field 430 and send an IM to the hearing-impaired party's screen name. If the hearing-impaired party is on-line, a message window may be "popped" on the screen of user device 120 indicating that a call has been received. The message window may include the telephone number of the calling party.

If the hearing-impaired party at user device 120 is online when the message is popped, the hearing-impaired party may type a message, such as "Hello, this is Bill". CA 140 receives the IM and voices the corresponding message to the calling party at user device 150. CA 140 may then type IMs corresponding to the voice messages of the hearing party at telephone device 150 and transmit the IMs to the hearing-impaired party at user device 120. The hearing-impaired party may IM his/her response, which the operator at CA 140 may voice to the hearing party at telephone device 150.

If the hearing-impaired party does not respond to the second preferred method, CA 140 (or server 130) may try the third preferred method by reading the information stored in field 420-3 and so on until a connection is established.

If CA 140 is unable to establish a connection via any of the methods stored in database 400, CA 140 may inform the hearing party at telephone device 150 that the called party is not available and may take a message for the hearing-impaired party (act 590). The message may be stored and made available for later retrieval by the hearing-impaired party (act 590). For example, CA 140 may store the message and provide an indication to user device 120 that a message has been stored from a caller. The hearing-impaired party at user device 120 may then retrieve the stored message at a later time.

In the manner described above, a hearing party may establish a communication link to a hearing-impaired party without first calling a designated relay number. That is, the hearing party may initiate a telephone call to the hearing-impaired party by simply placing a call to the hearing-impaired party's telephone number. Server 130 and/or CA 140 then automatically establish the communication link to the hearing-impaired party without first requesting additional information from the calling party, such as requesting the name and/or telephone number of the hearing-impaired party. This greatly simplifies the process of establishing communications with a hearing-impaired party and makes it much more likely that hearing parties will initiate communications with hearing-impaired parties.

A similar process may occur when a hearing-impaired party wishes to establish communications with a hearing party. For example, a hearing-impaired party may contact server 130 to establish communications with another party. Server 130 may identify an appropriate CA and forward the connection from the hearing-impaired party to the CA. The CA may then retrieve the information stored in database 400 to identify the preferred communication method and other information, such as screen name, associated with the call. CA 140 may then establish a connection with telephone device 150. The hearing-impaired party, via user device 120, and CA 140 may then communicate via, for example, streaming text messages, video images, IMs, etc., as described above, with CA 140 acting as the conduit for the conversation between the hearing party at telephone device 150 and the hearing-impaired party at user device 120.

As discussed above, CA 140 and/or server 130 may attempt to initiate communications with a hearing-impaired party by any one of a number of methods identified in database 400. For example, CA 140 may establish communications with user device 120 via any number of wired and/or wireless systems. Examples of wired systems include the PSTN and the Internet. In implementations in which communications is established via the Internet, CA 140 may establish a connection to user device 120 using, for example, an IP address associated with user device 120, a screen name associated with user device 120, an email address associated with user device 120, etc. In implementations in which communications is established via wireless systems, CA 140 may establish a connection to user device 120 using, for example, a conventional wireless network, a satellite-based network, etc. Wireless communications, such as wireless fidelity (Wi-Fi) and Bluetooth may also be used by user device 120 and/or CA 140 in implementations consistent with the invention.

CA 140, consistent with the invention, may also establish communications with user device 120 via specialized software (e.g., VRS). CA 140 may also establish communications with user device 120 via conventional instant messaging software, SMS software or other text messaging software. In still other implementations, CA 140 may establish communications by placing a telephone call to user device 120. The telephone call may be placed to the telephone number assigned to the hearing-impaired party and the connection to user device 120 may be made via the PSTN and/or the Internet. CA 140 may further establish communications with user device 120 via a paging system or a TDD/TTY system. In each case, user device 120 may be configured to receive the particular type of communication. That is, if specialized software or hardware is required at user device 120, user device 120 may download the software via server 130 or another platform, if necessary, or obtain the necessary hardware from another party, such as a service provider associated with providing services for the hearing-impaired. In some implementations, modifications to conventional programs, such as text messaging programs, may be needed to facilitate communications between a hearing-impaired party, a CA and a hearing party. In this case, server 130 or another platform may provide the modified software to the hearing-impaired party.

The connection between user device 120 and CA 140, as described above, may be a persistent, full duplex link. As described herein, the term "persistent, full duplex" refers to a communication link that is always connected and allows both parties to simultaneously transmit information. Such links do not require either the hearing-impaired party or the party at the opposite end (e.g., an operator at CA 140) to press a "send" or "receive" button. Further, such full duplex links allow each party to view messages in a streaming manner as the messages are being typed in real-time or near real-time without waiting for the sending party to complete the message and press "send". This helps prevent the "conversation" between the hearing-impaired party at user device 120 and the operator at CA 140 from getting out of synchronization when communicating with each other. The full duplex link may be implemented using, for example, Java, JavaScript or another programming language.

CONCLUSION

Systems and methods consistent with the present invention facilitate communications between hearing parties and hearing-impaired parties by allowing a hearing party to initiate communications by simply placing a call to a telephone number associated with the hearing-impaired party. Server 130 and/or CA 140 may then automatically determine an appropriate communication method based on the terminating telephone number and establish a communication link to the hearing-impaired party.

In this disclosure, there is shown and described preferred embodiments of the invention, but, as aforementioned, it is to be understood that the invention is capable of use in various other combinations and environments and is capable of changes or modifications within the scope of the inventive concept as expressed herein.

For example, encryption may be utilized in one or more of the communication methods described above. In addition, the present invention has been described above with respect to a hearing-impaired party registering for a telephone number and being assigned a telephone number. In some implementations, server 130 may determine the area code in which the hearing-impaired resides and provide the hearing-impaired party with a telephone number in that particular area code. Alternatively, server 130 may request that the hearing-impaired party select an area code. In this implementation, the hearing-impaired party may select an area code that allows him/her to place and receive "local" calls in that particular area code. In still other implementations, the hearing-impaired party may be provided with a personal toll free number (e.g., an 800 number). This personal toll free number may allow any party to place a call to the hearing-impaired party without the calling party incurring any charges. This may help further increase the number of calls that hearing parties initiate to hearing-impaired parties.

Further, the present invention has been described with the example of server 130 assigning a "new" telephone number to the hearing-impaired party. In other implementations, server 130 may use the hearing-impaired party's existing telephone number to provide the services described above. That is, server 130 may request that the hearing-impaired party provide his/her telephone number. Server 130 may then store this telephone number in database 400 along with the selected communication method(s) by which the hearing-impaired party wishes to communicate. When a telephone call with this number is received, one or more devices/platforms will forward this call to server 130. Processing may then proceed as described above.

In addition, the present invention has been described with respect to an entity, such as a service provider, assigning a telephone number to a hearing-impaired party and then performing various processes associated with facilitating communications involving the hearing-impaired party once a call has been received. In some implementations, one or more entities that are not associated with each other may be involved in the above described processes. That is, a first entity may assign a telephone number to a hearing-impaired party. A second entity not affiliated with or associated with the first entity may then perform one or more of the other processes described above, such as providing options to the hearing-impaired party with respect to the various methods of communicating or providing CA related services.

Further, voice recognition software may be used in one or more of the methods described above to automatically generate text messages based on the received voice messages and automatically send the text messages to the hearing-impaired party via a text messaging program. Further, text messages received by a CA may be automatically translated into voice messages using text-to-voice software. This may eliminate the need for a human operator at CA workstations.

Lastly, series of acts have been described with respect to FIGS. 3 and 5. The order of the acts may be varied in other implementations consistent with the present invention. Moreover, non-dependent acts may be performed in parallel.

No element, act, or instruction used in the description of the present application should be construed as critical or essential to the invention unless explicitly described as such.

Also, as used herein, the article "a" is intended to include one or more items. Where only one item is intended, the term "one" or similar language is used.

The scope of the invention is defined by the claims and their equivalents.

What is claimed is:

1. A method for providing communication services, comprising:
   receiving a first telephone call from a first hearing party, the first telephone call having a terminating number corresponding to a telephone number associated with a hearing-impaired party;
   storing information identifying a plurality of communication methods by which the hearing-impaired party wishes to communicate, a first one of the communication methods being instant messaging;
   forwarding the first telephone call to a first communication assistant; and
   establishing a communication link, using the stored information, from the first communication assistant to the hearing-impaired party based on the terminating number.

2. The method of claim 1, wherein the plurality of communication methods further comprises a second method, the method further comprising:
   receiving information from the hearing-impaired party indicating an order with respect to attempting to establish the communications link via the first and second communication methods.

3. The method of claim 1, wherein a second one of communication methods comprises an Internet-based communication method.

4. The method of claim 1, wherein a second one of the communication methods comprises a wireless communication method.

5. The method of claim 1, further comprising:
   assigning the telephone number to the hearing-impaired party;
   providing instructions to the hearing-impaired party associated with activating the assigned telephone number;
   receiving information from the hearing-impaired party in response to the instructions; and
   determining whether to activate the assigned telephone number based on the received information.

6. The method of claim 5, wherein the determining whether to activate the assigned telephone number comprises:
   determining whether the received information was sent from an instant messaging screen name that corresponds to information provided by the hearing-impaired party.

7. The method of claim 1, wherein the establishing comprises:
   attempting to establish a communication link with the hearing-impaired party via the first communication method in response to the first telephone call, and
   attempting to establish a communication link with the hearing-impaired party via a second communication method when the first communication method is not successful.

8. The method of claim 1, wherein the establishing comprises establishing the communication link to the hearing-impaired party without requesting information from the first hearing party.

9. The method of claim 1, further comprising:
   receiving a second telephone call from a second hearing party, the second telephone call having the terminating number corresponding to the telephone number associated with the hearing-impaired party;
   forwarding the second telephone call to a second communication assistant;
   attempting to establish a communication link from the second communication assistant to the hearing-impaired party based on the terminating number;
   storing a message from the second hearing party when the hearing-impaired party is not available; and
   providing an indication to a user device associated with the hearing-impaired party that the message is stored.

10. The method of claim 9, further comprising:
    providing the message to the hearing-impaired party at a later time.

11. A system, comprising:
    a server configured to:
      receive a first telephone call from a first hearing party, the first telephone call having a terminating number,
      identify a communication assistant, and
      forward the first telephone call;
    a database configured to:
      store a plurality of telephone numbers and at least one method associated with each of the plurality of telephone numbers, the at least one method identifying a method by which a hearing-impaired party wishes to communicate and wherein a first one of the at least one method is instant messaging; and
    a first device associated with the communication assistant, the first device being configured to:
      receive the forwarded first telephone call, and
      establish a communication link with a hearing-impaired party based on the terminating number and information stored in the database.

12. The system of claim 11, wherein the at least one method further comprises a second method and the database is further configured to:
    store information identifying an order with respect to attempting to establish communications with the hearing-impaired party via the first and second methods.

13. The system of claim 11, wherein a second one of the at least one method comprises an Internet-based communication method.

14. The system of claim 11, wherein a second one of the at least one method comprises using short message service.

15. The system of claim 11, wherein a second one of the at least one method comprises using a video relay service.

16. The system of claim 11, wherein the server is further configured to:
    provide instructions to the hearing-impaired party associated with activating an assigned telephone number,
    receive information from the hearing-impaired party in response to the instructions, and
    determine whether to activate the assigned telephone number based on the received information.

17. The system of claim 16, wherein when determining whether to activate the assigned telephone number, the server is configured to:
    determine whether the received information was sent via an instant messaging screen name that corresponds to information provided by the hearing-impaired party.

18. The system of claim 11, wherein when establishing the communication link, the first device is configured to:
    access the database to identify a preferred method of communicating with the hearing-impaired party, and
    establish the communication link using the preferred method.

19. The system of claim 11, wherein when establishing the communication link, the first device is configured to:
attempt to establish a communication link with the hearing-impaired party via the first method in response to the first telephone call, and
attempt to establish a communication link with the hearing-impaired party via a second method when the first method is not successful.

20. The system of claim 11, wherein when establishing the communication link, the first device is configured to:
establish the communication link without receiving information from the first hearing party.

21. The system of claim 11, wherein the server is further configured to:
receive a second telephone call from a second hearing party, the second telephone call having the terminating number, and
forward the second telephone call; and
wherein the first device is further configured to:
receive the forwarded second telephone call,
attempt to establish a communication link from the communication assistant to the hearing-impaired party based on the terminating number, and
store a message from the second hearing party when the hearing-impaired party is not available.

22. The system of claim 21, wherein the first device is further configured to:
provide an indication to a user device associated with the hearing-impaired party that the message is stored, and
allow the hearing-impaired party to retrieve the message.

23. A system, comprising:
means for receiving a telephone call from a hearing party, the telephone call having a terminating number corresponding to a telephone number assigned to a hearing-impaired party;
means for forwarding the telephone call to a first device;
means for storing a plurality of telephone numbers and at least one method associated with the plurality of telephone numbers, the at least one method corresponding to a preferred method of communicating with a hearing-impaired party, wherein the at least one method associated with at least some of the plurality of telephone numbers is instant messaging; and
means for establishing a communication link from the first device to the hearing-impaired party based on the terminating number and information stored by the means for storing.

24. The system of claim 23, wherein the at least one method comprises a plurality of methods and the means for establishing comprises:
means for attempting to establish a communication link with the hearing-impaired party via a first one of the plurality of methods in response to the telephone call, and
means for attempting to establish a communication link with the hearing-impaired party via a second one of the plurality of methods when the first method is not successful.

25. The system of claim 23, further comprising:
means for storing messages for the hearing-impaired party when the hearing-impaired party is not available; and
means for providing an indication to a user device associated with the hearing-impaired party that at least one message is stored.

26. A method, comprising:
receiving a first telephone call from a first party, the first telephone call having a terminating number corresponding to a telephone number associated with a hearing-impaired party;
accessing a database comprising a plurality of telephone numbers and at least one communication method associated with each of the plurality of telephone numbers wherein the at least one communication method associated with at least some of the plurality of telephone numbers is instant messaging or video relay service;
identifying a first communication method associated with the hearing-impaired party based on information in the database; and
establishing a communication link to the hearing-impaired party based on the terminating number and using the first communication method.

27. The method of claim 26, wherein the establishing comprises:
establishing the communication link without interacting with the first party to receive information from the first party.

28. The method of claim 26, wherein the identifying a first communication method comprises:
identifying a communication method associated with the terminating number.

29. The method of claim 26, wherein the first communication method comprises a preferred communication method selected by the hearing-impaired party.

30. The method of claim 26, further comprising:
assigning the telephone number to the hearing-impaired party; and
validating the telephone number.

31. The method of claim 30, wherein the validating comprises:
providing instructions to the hearing-impaired party associated with activating the assigned telephone number,
receiving information from the hearing-impaired party in response to the instructions, and
determining whether to activate the assigned telephone number based on the received information.

32. The method of claim 26, further comprising:
providing a plurality of options to the hearing-impaired party, each of the options representing a communication method;
receiving a selection from the hearing-impaired party corresponding to a first one of the options; and
storing information corresponding to the first option with the telephone number assigned to the hearing-impaired party, and wherein the identifying the first communication method comprises:
identifying the first option.

33. The method of claim 26, further comprising:
receiving a second telephone call from a second party, the second telephone call having the terminating number corresponding to the telephone number associated with the hearing-impaired party;
attempting to establish a communication link to the hearing-impaired party, in response to the second telephone call, using the first communication method;
attempting to establish a communication link to the hearing-impaired party using at least one other communication method, in response to the second telephone call, when the first communication method is not successful; and
storing a message from the second party for the hearing-impaired party when the communication link to the hearing-impaired party is not established via the first communication method or the at least one other communication method.

34. The method of claim 33, further comprising:
providing an indication to a user device associated with the hearing-impaired party that the message is stored; and
allowing the hearing-impaired party to retrieve the stored message.

35. A method, comprising:
receiving first information identifying a plurality of methods by which a hearing-impaired party wishes to communicate;
receiving second information identifying an order with respect to attempting to establish communications with the hearing-impaired party via the plurality of methods, a first one of the plurality of methods being instant messaging or video relay;
storing the first and second information;
receiving a telephone call from a hearing party, the telephone call having a terminating number corresponding to a telephone number associated with the hearing-impaired party; and
establishing a communication link, using the stored first and second information, from a communication assistant to the hearing-impaired party based on the terminating number.

36. The method of claim 35, further comprising:
providing at least one user interface to the hearing-impaired party for inputting the first and second information.

37. The method of claim 35, further comprising:
assigning a telephone number to the hearing-impaired party; and
providing instructions to the hearing-impaired party associated with activating the assigned telephone number.

38. The method of claim 37, further comprising:
receiving information from the hearing-impaired party in response to the instructions; and
determining whether to activate the assigned telephone number based on the received information.

39. The method of claim 35, further comprising:
assigning a toll free telephone number to the hearing-impaired party.

40. A system, comprising:
processing logic configured to:
receive first information identifying at least one method by which a hearing-impaired party wishes to communicate, a first one of the at least one method being instant messaging or video relay, and
receive second information identifying an order with respect to attempting to establish communications with the hearing-impaired party via the at least one method; and
a memory configured to:
store the first and second information,
wherein the processing logic is further configured to:
receive a telephone call from a hearing party, the telephone call having a terminating number corresponding to a telephone number associated with the hearing-impaired party, and
establish a communication link, using the stored first and second information, from a communication assistant to the hearing-impaired party based on the terminating number.

41. The system of claim 40, wherein the processing logic is further configured to:
provide at least one user interface to the hearing-impaired party for inputting the first and second information.

42. The system of claim 40, wherein the processing logic is further configured to:
assign a telephone number to the hearing-impaired party, and
provide instructions to the hearing-impaired party associated with activating the assigned telephone number.

43. The system of claim 42, wherein the processing logic is further configured to:
receive information from the hearing-impaired party in response to the instructions, and
determine whether to activate the assigned telephone number based on the received information.

* * * * *